United States Patent
Wang et al.

(10) Patent No.: US 10,574,899 B2
(45) Date of Patent: *Feb. 25, 2020

(54) PEOPLE DETECTION METHOD FOR AUTO-FRAMING AND TRACKING IN A VIDEO CONFERENCE

(71) Applicant: Polycom, Inc., San Jose, CA (US)

(72) Inventors: Xiangdong Wang, North Billerica, MA (US); Yibo Liu, Reading, MA (US); Jinwei Feng, Woburn, MA (US); Edmund Thompson, Burlington, MA (US); Peter Chu, Lexington, MA (US)

(73) Assignee: Polycom, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/227,815

(22) Filed: Dec. 20, 2018

(65) Prior Publication Data
US 2019/0174068 A1    Jun. 6, 2019

Related U.S. Application Data

(63) Continuation of application No. 15/640,371, filed on Jun. 30, 2017, now Pat. No. 10,187,579.

(51) Int. Cl.
| | |
|---|---|
| *H04N 5/232* | (2006.01) |
| *G06K 9/00* | (2006.01) |
| *H04N 5/247* | (2006.01) |
| *G06T 7/20* | (2017.01) |
| *H04N 7/15* | (2006.01) |
| *H04N 7/14* | (2006.01) |

(52) U.S. Cl.
CPC ..... *H04N 5/23296* (2013.01); *G06K 9/00255* (2013.01); *G06K 9/00369* (2013.01); *G06T 7/20* (2013.01); *H04N 5/247* (2013.01); *H04N 7/147* (2013.01); *H04N 7/15* (2013.01); *H04N 7/152* (2013.01); *G06T 2207/10016* (2013.01); *G06T 2207/30201* (2013.01)

(58) Field of Classification Search
CPC ........... H04N 5/23296; H04N 5/23299; H04N 5/23254; H04N 5/23219; H04N 5/2258; H04N 7/147; H04N 7/15; H04N 5/247; H04N 7/152; G06K 9/00234; G06K 9/00255; G06K 9/00369; G06T 7/20; G06T 2207/30201; G06T 2207/10016
See application file for complete search history.

(56) References Cited

U.S. PATENT DOCUMENTS

| | | | |
|---|---|---|---|
| 6,373,516 B1 | 4/2002 | Kim | |
| 10,187,579 B1 * | 1/2019 | Wang | ..................... H04N 7/147 |
| 2002/0101505 A1 | 8/2002 | Gutta et al. | |

(Continued)

*Primary Examiner* — Stella L. Woo
(74) *Attorney, Agent, or Firm* — Blank Rome, LLP

(57) ABSTRACT

A videoconference apparatus and method coordinates a stationary view obtained with a stationary camera to an adjustable view obtained with an adjustable camera. The stationary camera can be a web camera, while the adjustable camera can be a pan-tilt-zoom camera. As the stationary camera obtains video, participants are detected and localized by establishing a static perimeter around a participant in which no motion is detected. Thereafter, if no motion is detected in the perimeter, any personage objects such as head, face, or shoulders which are detected in the region bounded by the perimeter are determined to correspond to the participant.

20 Claims, 8 Drawing Sheets

(56) References Cited

U.S. PATENT DOCUMENTS

| | | | |
|---|---|---|---|
| 2008/0291333 A1* | 11/2008 | Subbotin | H04N 5/23248 348/700 |
| 2014/0049595 A1 | 2/2014 | Feng et al. | |
| 2015/0310274 A1* | 10/2015 | Shreve | G06K 9/00624 382/103 |
| 2015/0365627 A1 | 12/2015 | Deng et al. | |

* cited by examiner

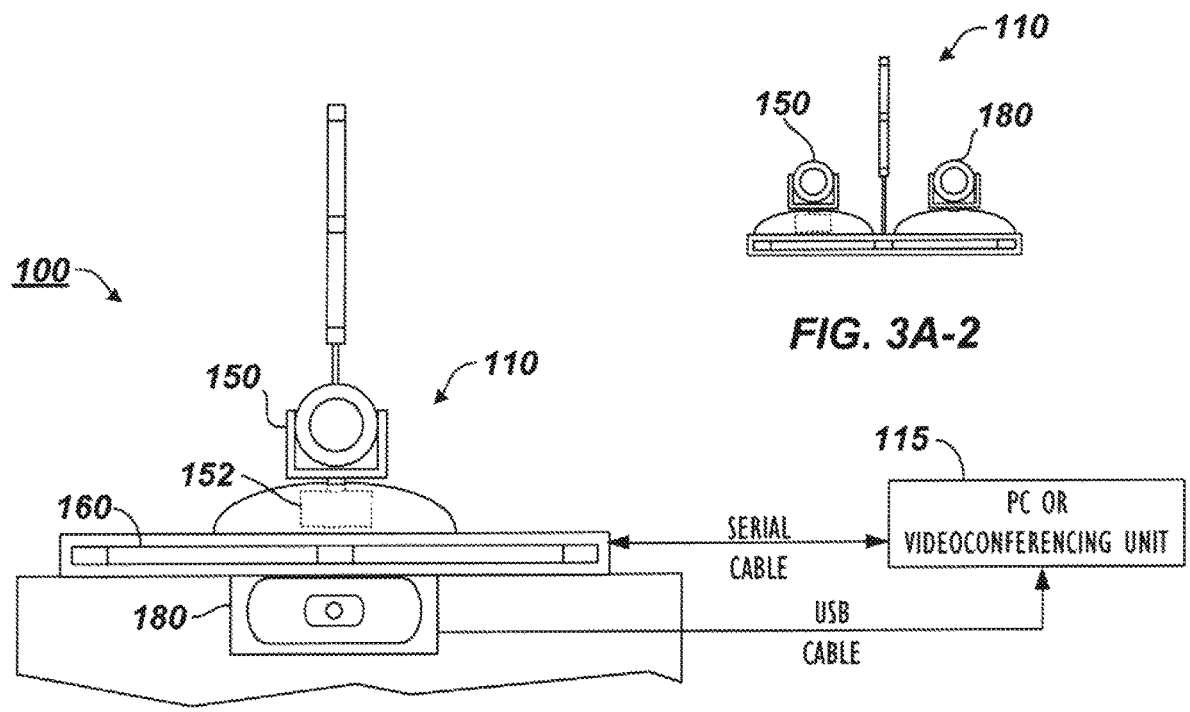
FIG. 3A-2
FIG. 3A-1
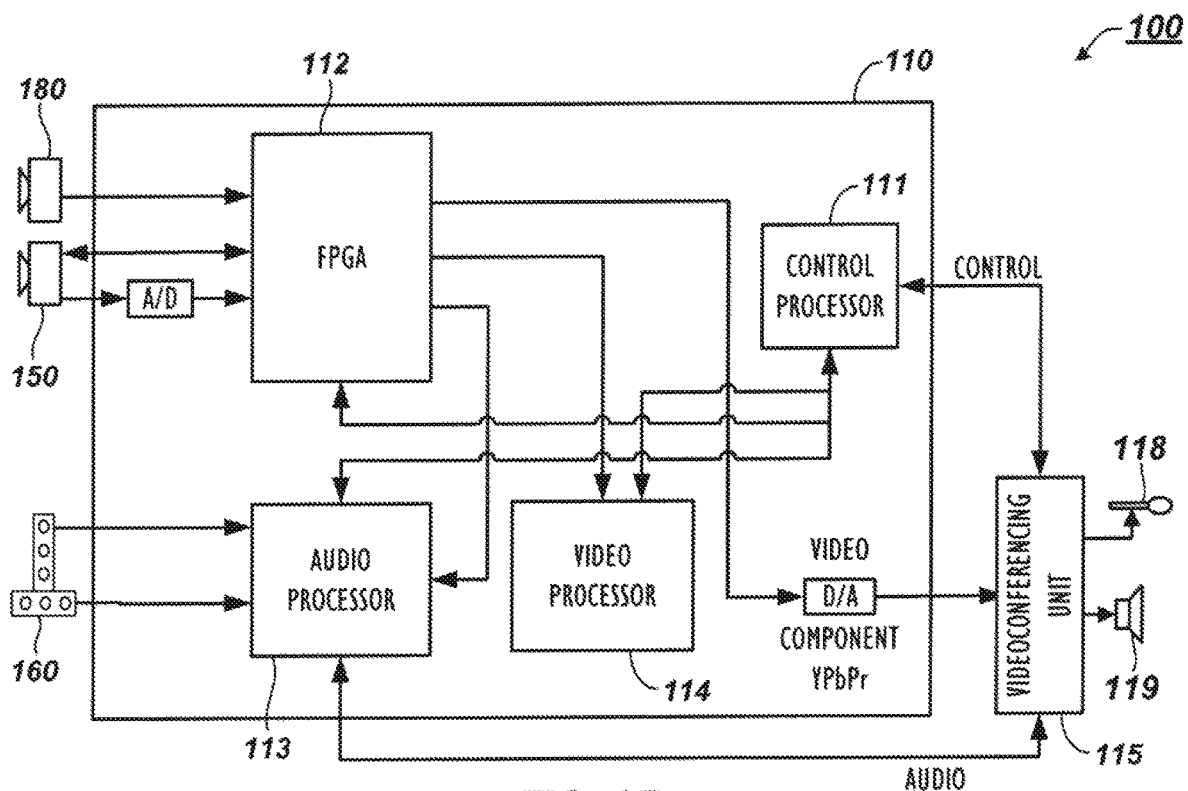
FIG. 3B

PEOPLE DETECTION METHOD FOR AUTO-FRAMING AND TRACKING IN A VIDEO CONFERENCE

CROSS-REFERENCE TO RELATED APPLICATIONS

This application is a continuation of U.S. application Ser. No. 15/640,371 filed Jun. 30, 2017, entitled "People Detection Method for Auto-Framing and Tracking in a Video Conference," the contents of which is incorporated herein in its entirety.

This application is related to U.S. application Ser. No. 15/017,262 filed Feb. 5, 2016, which claims priority to U.S. Provisional Application No. 62/112,525 filed Feb. 5, 2015, entitled "Face Brightening to Compensate for Back-Lighting," the contents of which applications are entirely incorporated herein.

TECHNICAL FIELD

This disclosure is generally concerned with video conferencing, and more specifically with methods and equipment for accurately detecting and framing meeting participants for display on a display device.

BACKGROUND

The camera for a videoconferencing system often has mechanical pan, tilt, and zoom control. Ideally, these controls should be continuously adjusted to achieve optimal video framing of the people in the room based on where they are seated and who is talking. Unfortunately, due to the difficulty of performing these adjustments, the camera may often be set to a fixed, wide-angle view of the entire room and may not be adjusted. If this is the case, far-end participants may lose much of the value from the video captured by the camera because the size of the near-end participants displayed at the far-end may be too small. In some cases, the far-end participants cannot see the facial expressions of the near-end participants, and may have difficulty identifying speakers. These problems give the videoconference an awkward feel and make it hard for the participants to have a productive meeting.

To deal with poor framing, participants may have to intervene and perform a series of manual operations to pan, tilt, and zoom the camera to capture a better view. As expected, manually directing the camera can be cubersome even when a remote control is used. Sometimes, participants do not bother adjusting the camera's view and simply use the default wide view. Of course, when a participant does manually frame the camera's view, the procedure has to be repeated if participants change positions during the videoconference or use a different seating arrangement in a subsequent videoconference.

Voice-tracking cameras having microphone arrays can help direct the camera during the videoconference toward participants who are speaking. Although the voice-tracking camera is very useful, it can still encounter some problems. When a speaker turns away from the microphones, for example, the voice-tracking camera may lose track of the speaker. Additionally, a very reverberant environment can cause the voice-tracking camera to direct at a reflection point rather than at an actual sound source of a person speaking. For example, typical reflections can be produced when the speaker turns away from the camera or when the speaker sits at an end of a table. If the reflections are troublesome enough, the voice-tracking camera may be guided to point to a wall, a table, or other surface instead of the actual speaker.

One solution to the problem of directing a camera during a videoconference is disclosed in U.S. Pat. No. 6,894,714 to Gutta et al., which discloses an apparatus and methods which use acoustic and visual cues to predict when a participant is going to speak or stop speaking. As shown in FIG. 1, an adaptive position locator 30 of Gutta includes a wide-angle camera 20, a microphone array 22, and a pan-tilt-zoom camera 34. During a videoconference, the locator 30 processes audio and video to locate a speaker.

To do this locating, the wide-angle camera 20 and the microphone array 22 generate signals at initial startup. The signals from the wide-angle camera 20 pass to a face recognition module 32, which has a face detector to determine whether or not a given region of interest (window) can be labeled as a face region so a unique identifier can be assigned to a given face. Likewise, signals from the microphone array 22 pass to a speaker identification module 33 and an audio locator 36, which obtains directional information that identifies pan and tilt angles associated with a participant who is speaking.

Then, the images from the wide-angle camera 20 along with the results of face recognition and their locations are stored in a frame buffer 39 along with the audio signals from the microphone array 22 and the results of the speaker identification. The audio and video signals are accumulated for a predefined interval, and a motion detector 35 detects motion in the video frames occurring during this interval. In the end, a space transformation module 37 receives position information from the motion detector module 35 and directional information from the audio locator 36 and then maps the position and direction information to compute a bounding box used to focus the PTZ camera 34.

At this point, a predictive speaker identifier 40 identifies one or more acoustic and visual cues to predict the next speaker. In particular, the predictive speaker identifier 40 processes the video from the PTZ camera 34 and the contents of the frame buffer 39 and speaker identification module 33. As noted above, the contents of the frame buffer 39 include the wide-angle images from the wide-angle camera 34 and the corresponding face recognition results, the audio signals from the microphone array 22, and the corresponding speaker identification results. Based on this information, the predictive speaker identifier 40 can identify the visual and acoustic cues of each non-speaking participant from the wide-angle image and audio signals. Ultimately, the speaker predictions generated by the predictive speaker identifier 40 are used to focus the PTZ camera 34 at the next predicted speaker.

As can be seen above, systems that use voice tracking and participant detection may require complex processing and hardware to control a camera during a videoconference. Moreover, such systems can have practical limitations. For example, such systems may require an operator to manually initiate the automated operation by pressing a button. This is the case because such systems require a sufficient period of time for training to operate properly. For example, such a system has to work in a training mode first and then has to switch to an active mode, such as a predictive mode to predict who will speak. The switching from training mode to active mode requires the manual user intervention.

Yet, requiring manual initiation of the automated functions can cause problems when people walk in or out of a room during a meeting. Additionally, for the automated control of the camera to operate properly, all of the participants need to face the camera. For example, the automated control of the camera fails when a participant turns his head away from the camera, which can happen quite often in a video conference.

Another solution is set forth in U.S. Pat. No. 8,842,161 to Jinwei Feng et al. That patent discloses a videoconference apparatus and method which coordinates a stationary view obtained with a stationary camera to an adjustable view obtained with an adjustable camera. The stationary camera can be a web camera, while the adjustable camera can be a pan-tilt-zoom camera. As the stationary camera obtains video, faces of participants are detected, and a boundary in the view is determined to contain the detected faces. Absence and presence of motion associated with the detected face is used to verify whether a face is reliable. In Jinwei, in order to capture and output video of the participants for the videoconference, the view of the adjustable camera is adjusted to a framed view based on the determined boundary. Jinwei combined the technology of sound source location (SSL), participant detection and motion detection to locate the meeting attendees and decide what the optimal view would be, based on the location information, and then control the adjunct pan-tilt-zoom (PTZ) camera to pan, tilt and zoom to get the desired view. The methods set forth in Jinwei work very well in most videoconferencing situations. However, there are certain situations in which these methods may underperform. There is thus room for improvement in the art.

SUMMARY

Embodiments of this disclosure pertain to one or more cameras which are automatically adjusted to continuously and instantly provide an optimal view of all persons attending a video conference using auto-framing. Embodiments of this disclosure pertain to automatically adjusting one or more cameras continuously and instantly provide an optimal view of a person who is speaking using a speaker-tracking method. These automatic adjustments are enabled by fast and reliable people detection methods. Such methods involve quickly determining the sizes and locations of the meeting attendees and/or speakers in the video feeds from one or more cameras.

BRIEF DESCRIPTION OF THE DRAWINGS

For the purpose of illustration, there are shown in the drawings certain embodiments described in the present disclosure. In the drawings, like numerals indicate like elements throughout. It should be understood that the full scope of the inventions disclosed herein are not limited to the precise arrangements, dimensions, and instruments shown. In the drawings:

FIGS. 3A-1 and 3A-2 illustrate the endpoint having a videoconferencing unit connected to a video device, which has an adjustable camera and an adjunct camera.

FIG. 3B schematically illustrates the endpoint of FIGS. 3A-1 and 3A-2.

DETAILED DESCRIPTION

Figure 1:
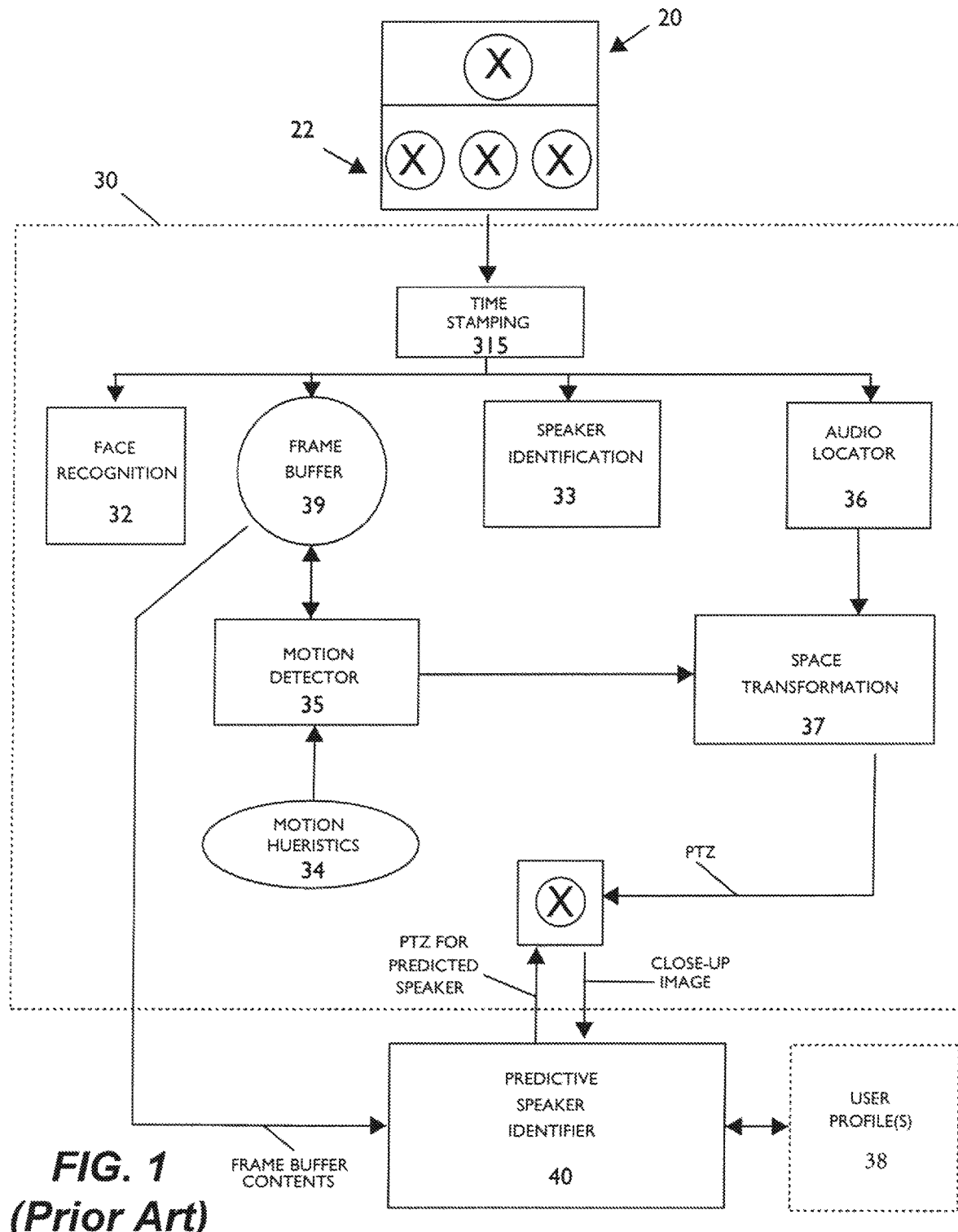
FIG. 1 illustrates a functional block diagram of an adaptive position locator according to the prior art.

Reference will now be made in detail to implementations of the technology. Each example is provided by way of explanation of the technology only, not as a limitation of the technology. It will be apparent to those skilled in the art that various modifications and variations can be made in the present technology. For instance, features described as part of one implementation of the technology can be used on another implementation to yield a still further implementation. Thus, it is intended that the present encompass such modifications and variations.

Descriptions of terms used within this disclosure are provided as follows. 'Personage object' refers to parts or appendages or regions of a human body, including, but not limited to, the face, head, torso, shoulders, skin tone, eyes, and lips. The term can also include sound or audio information generated by a person, such as by speaking. 'Coupled' refers to components or devices which able interact with one another, either directly or indirectly. All connected elements are coupled, but not all coupled elements are connected. Coupled elements include those which are in communication with each other. 'Proximity' refers to the degree to which items or elements or components etc. are close to one another. Elements are 'proximate' when they are near each other, as would be understood by a person of skill based on the context.

The technology described herein can be used in video conferencing environments which include one or more advanced camera devices such as smart cameras.

In a videoconference apparatus and method of this disclosure, a stationary or fixed view of an environment is obtained with a stationary or fixed camera of the apparatus and is coordinated with an adjustable view of the environment obtained with a second, adjustable camera. In one arrangement, the stationary camera is a web camera, while the adjustable camera is a controllable camera, such as a pan-tilt-zoom camera, although other arrangements can be used. These two cameras are preferably co-located in or on a shared housing location.

During the videoconference, the stationary camera obtains stationary video in the stationary view of the environment, while the adjustable camera can obtain active video in the adjustable view of the environment. It will be understood that multiple stationary and adjunct cameras can be utilized, though for the sake of simplicity and clarity, most embodiments described refer to one of each. Thus, it is implied that each of the embodiments could involve one or more additional cameras. For the purposes of the videoconference, the stationary video may be used primarily to determine locations of participants and may not be output for the videoconference, although this is possible in some circumstances. The adjunct or whole view camera (commonly stationary) thus acts as a sort of spotter for one or more (main) adjustable cameras. The active video of the adjustable camera, may be used as the primary video for output in the videoconference.

To improve data capture of participants for inclusion in output video, the adjustable camera is adjusted automatically to provide an optimal view of all the meeting attendees (auto-framing) or the speaker (speaker-tracking) continuously and instantly during a video conference. In order to enable this process, fast and reliable people detection methods to determine the size and location of the meeting attendees or speakers in the video are disclosed.

As the videoconference proceeds, the apparatus detects participants in the stationary video captured with the stationary camera. Detecting participants can be based on techniques involving one or more of face detection, facial recognition, head detection, torso detection, motion detection, and human skin tone detection, (personage objects). The apparatus verifies whether the detected participants are 'reliable' participants by analyzing areas of the stationary video associated with each of the detected participants for motion. Some non-limiting examples of verification processes are discussed below:

The area of interest for a detected face can include an on-face section at the location of the detected face. If motion is detected at this on-face section for a given detected face, then the apparatus can indicate the given face as reliable. Rather than just disregarding the given detected face when motion detection fails to find motion in the on-face section, the apparatus can instead determine whether the location of the given face was previously detected and indicated as reliable. If so, then the participant detection can still be reliable even though motion has not been detected in the on-face section.

Area of interest for a detected face can further include surrounding sections around the on-face section of the detected face. These surrounding sections can be analyzed for motion to verify that a detected face is reliable by determining whether a person has moved (or is moving) from the location of the detected face. In this sense, the motion detection of the apparatus verifies a face by finding an absence of motion. For example, previous face detection may have been made finding a reliable face at a particular location, but current processing may have not detected the face. This might be because the person has turned her head away from the camera, may have obscured her face, etc., or the face detection may have failed for whatever reason. The apparatus determines that the person is still at this location by verifying that no motion is detected in the surrounding sections of the previously detected face.

However, face detection, when used in isolation, can have drawbacks. For example, face detection will be less accurate when attendees (participants) turn away from the camera. And it can fail when the attendees face directly away from the camera, such that only the backside of their head is detectable by the camera. Additionally, it can be difficult to detect faces when the image quality of the facial area is poor—in other words when a particular camera is less than optimal, or due to other factors.

Likewise, motion detection, whether utilized with facial detection or not, also has drawbacks. For example, attendees may sit or stand still without moving for periods of time. In that instance a motion detector may not detect their presence. By the same token, source of sound locating (SSL) does not work so well when attendees stay quiet. SSL can also be less accurate when a person who is speaking turns away from the microphone, or when the environment is reverberant, or when microphone quality is less than optimal. To be clear, the above-described methods are all important and useful, and may be included in one or more "complete" solutions, as will be described below.

The above-referenced methods can thus be combined with, and in some cases be replaced by, one or more additional techniques. For example, in order to better detect participants, the apparatus can use torso detection for auto-framing and tracking functions. Torso detection, in combination with other methods, including face detection methods, can enable tracking and detection in situations where this would not otherwise be the case. The videoconferencing apparatus can thus hybridize various people detection methods, including torso detection, face detection, motion detection, and source of sound location (SSL). When a participant is detected, the detection is evaluated for reliability.

After verifying the reliability of the participant detection(s), the apparatus determines a boundary in the stationary view of the environment containing the reliably detected participants. To capture and output video of the participants for the videoconference, the apparatus adjusts the adjustable view of the adjustable camera to a framed view of the environment based on the determined boundary. Active video captured in the framed view with the adjustable camera can be sent to a far-end for the videoconference.

During the videoconference, participants may join or leave the environment, or they may move in the environment. Therefore, the apparatus determines such boundaries on an active basis, such as at regular intervals on a frame-by-frame basis, and adjusts any current boundary with a new boundary as needed. For example, the apparatus adjusts to a new boundary when a participant moves out of a current boundary, a new participant enters the environment in the stationary view outside the boundary, etc.

To keep track of the participants, the apparatus can store current face, head and torso locations of the participants in the stationary view. When processing the stationary video for face detection (for example), the apparatus can determine whether any new face locations differ from those previous locations for faces. Based on a change in the environment, the apparatus can then adjust the boundary so that all of the participants can be framed by the adjustable camera. Determining the face locations, head locations, and torso locations, and adjusting the view of the adjustable camera can be further augmented using audio captured in the environment to determine bearing angles of source locations of audio (SSL) from the participants and coordinating the audio source locations to the detected participants.

In at least one embodiment of this disclosure, a PTZ camera is used to make adjustments to video pickup and framing for use in a videoconference. Making the correct adjustments, can be difficult, especially if the number of people in a meeting changes, or if the people change positions. The technology of this disclosure determines where people are located and zooms in on them automatically. This requires automatically detecting participants' sizes and locations. Automatic locating and zooming can include voice localization and face detection and combing the data from the two techniques. The SSL and face detection combination works best if the subject is looking at the camera and speaking. However, it can be desirable to see more than just the person who is currently speaking, and meeting participants do not usually keep their faces pointed towards the camera.

The technology described herein can combine three techniques—head, face and torso detection—to produce, in many instances, more accurate results than the SSL and face detection combination described above. In at least one embodiment, the technology can actually obviate the need for voice localization.

To provide a general understanding of the technology, some aspects of videoconferencing will be considered. When a person is not looking at a camera their head will, in most cases, still be observed. In addition to the participant's head, their shoulders and midsection may also be in view of the camera. That is, even when a participant turns their head away from the camera, their head and the curvature of theirs shoulders will usually remain in view. Detecting (and storing) upper body information, or simply 'torso detection' can be used to detect and track meeting participants. Detecting the upper half, or at least upper third, of personnel can be used to localize meeting attendees. Methods described herein can involve chest detection, head detection, and shoulder detection, and cross-referencing of data collected from the three.

The data can be combined in various ways. For example, a head and face may be detected proximate to one another. The technology will then determine whether one person has been detected, or if two people have been detected. This determination can be made using a "bird cage technique," to correctly match face data with its corresponding head data. The bird cage technique (or method) is so called because localization of a participant can be considered analogous to localizing a bird within a cage. That is, if a bird is placed in a cage and the cage door remains locked, the bird which is later observed to be in the cage the same bird that was placed there, regardless of whether the bird changes position, size, or orientation. The "bird cage" of the present technology uses motion detection to construct a "cage" consisting of a region at least partially surrounding a participant in which no motion is present. For example, once a face or head is detected, the technology will keep checking to determine whether the region at least partially surrounding the detected face and/or head is static, or if there is motion in that region. If the region is not static, this can be an indication that the person to whom the head and/or face belong has moved. On the other hand, if the region is static then it is likely that the participant has not moved, or to use the bird cage analogy, the person currently detected is the same person who was previously detected.

Determining and confirming the location of the static region (a/k/a boundary layer) thus serves to confirm that the person currently present in a video frame is the person of the previous person. Based on the confirmation of the participant, an identifier (ID) can be assigned to that person. The identifier can be an alphanumeric number or some other suitable identifier. Embodiments of the technology thus provide stable participant detection, and reliable tracking of a person based on the ID. For example, the camera can follow the movement of one or more IDs, and help to ensure that all identified persons will be in the camera view. Embodiments employing this technology do not require audio information in order to localize participants or track their positions. For example, even if a person never speaks during a videoconference, the head, face, and upper chest data corresponding to that person can be used to keep the person in view.

In at least one embodiment of this disclosure, face detection, head detection and torso detection can be used to detect participants. Face detection and facial motion detection can be useful in determining which participants are speaking, but it is not always required. For example, head and torso detection can be combined with audio detection technology (such as SSL and/or beam forming) to differentiate a speaker from amongst the people identified and tracked.

In at least one embodiment, the procedures of detecting and tracking include defining a time-of-latest-motion array; implementing face detection and upper torso detection techniques; matching of the detected personage objects (e.g., faces or torsos) detected; and determining whether the matching was accurate.

To define a time-of-latest-motion array, an array is created having the same resolution of the input video captured by the stationary camera. For example, if the image of the input video consists of 1280×720 pixels, then the array will have 1280×720 elements, and each element will record (store) the most recent time that the corresponding pixel was a "moving pixel."

Face detection and torso detection can use two categories of detector to detect different personage objects from the video frames: category of face detector and category of torso detector. The category of face detector contains five detectors for different types of face: vertical frontal face, left side of the face, right side of the face, frontal face that tilts to the left, frontal faces that tilts to the right. The category of torso detector contains three detectors for different types of upper torso: the left side of the upper torso, the right side of the upper torso, the frontal side of the upper torso.

Each detector detects certain types of personage objects from the images and records the size, location and detection time of the detected objects. Also a reliability score or rating can be assigned to each detected object.

Intra-frame and Inter-frame analysis of detection results can then be performed, with the goal being to determine whether detected personage objects correspond to the same person. Intra-frame matching analysis involves attempting to match objects detected in a single (current) frame from input video. The procedure of intra-frame matching includes two steps: matching and merging the objects by category, for example face with face, and torso with torso. For example, two faces will be considered as corresponding to the same participant if their locations are proximate and their sizes are similar; the same logic applies for other personage objects, such as torsos. A torso and a face will be determined to correspond to the same person when they overlap and the center of the detected face is higher than the center of the detected torso.

A similar logic applies to the inter-frame analysis. The goal of inter-frame analysis is to match detected objects from a current frame with those in previous frames. Inter-frame matching has at least two criteria. If the two detected objects overlap, that is occupy some of the same areas in both frames, then they correspond to the same attendee. If there is no inter-frame overlap between objects, then a "bird cage" technique can be applied, as will be described in greater detail below. A summarized description is provided here. If it is determined that one, and only one, bird is in a birdcage, and that birdcage's door remains closed, then the bird found inside the birdcage will always be the same one bird, even if it changes location within the cage. Similarly, if a bounding box can be determined in which two objects and only those two objects are located, and no motion occurs in the surrounding area of this bounding box between the detection times of these two objects, then these two objects are "matched," and hence considered to correspond to the same person. The motion information used by the bird cage method can be retrieved from the from the time-of-latest-motion array discussed above.

After the matching is finished, the detected objects are assigned a number or some other identifier (ID) to identify the person to which they correspond, (i.e., from which they came). Thus, objects with the same ID are considered as corresponding to the same person. A determination as to the reliability of the ID can then be made. An ID can be considered reliable if both face and torso of this ID are detected in current frame. An ID can also be considered reliable if a face or torso of this ID is detected in a current frame and the (previously determined) reliability score for that ID exceeds a predetermined threshold. All reliable IDs can be accepted and used for tracking the locations of meeting participants. Other IDs can be rejected. For the sake of completeness, it is noted that a given meeting participant can be assigned different IDs at different times. For example, if there were two people in a conference room, the first person could be assigned the ID "0" and the second person could be assigned the ID "1"; if the first person left the meeting and subsequently re-entered the room, the first person would, in most embodiments, be assigned a different ID, such as "2."

In at least one embodiment, an adjunct camera captures the view of the entire (or substantially the entire) meeting location. Once the whole view is captured, participants are detected within that view. Thereafter, zooming by one or more additional cameras on individuals and groups can take place. The view captured by the whole view camera can be analyzed on an ongoing/iterative basis using the detection techniques of this disclosure. The "bird cage" around a detected person can be used to properly create a frame view of that person using one of the one or more adjunct cameras. In some embodiments, the data from the adjustable camera can be analyzed like that data collected by the adjunct camera in order to increase accuracy and verify other data.

Returning to the subject of bird cage techniques or "bird caging," in some embodiments, video is captured at a rate of five frames per second (5 fps), and the frames are compared to identify difference between them. Each pixel for a given position can be compared amongst the five frames, in which illumination level (brightness) and color information for each pixel is checked. In embodiments in which brightness is measured from a zero value to 255, a difference threshold of 20 can be effective, though other thresholds can be appropriate depending on the exact configuration and equipment involved. The comparison is made for a pixel of a frame with an adjacent frame. If difference between corresponding pixels of adjacent frames exceeds the threshold then that pixel is considered a "moving pixel." In at least one embodiment of the technology, if even only one pixel within a given region is a moving pixel, the region is considered non-static.

As indicated above, the technology puts a certain region around a participant (or more specifically around one or more personage objects). If there is one or more moving pixels in that region, then the region is not static, and the participant is considered to have moved. In some embodiments, more than one pixel might be required within a region of the region to be considered non-static. For example, it may be appropriate to require more moving pixels in a noisy environment, or if the video data is noisy. Another example would be if the camera is of poor quality.

In order to localize a participant based on detection of one or more personage objects at a given location, a static boundary layer around the head and shoulders can be determined. This is done by searching within rectangles for motion pixels, (see FIG. 7). In at least one embodiment, the first rectangle begins just above the top of the person's head, and the width of the rectangle will be slightly wider than the detected shoulders. If there is motion in the region defined by the rectangle, the region is not static. A rectangular region of the same size can be defined one pixel height higher, effectively shifting the search rectangle up one pixel. The second rectangle can be searched for a pixel. The process of shifting and searching can continue until a static area is identified, or if a threshold number of shifts is exceeded, in which case the technology will determine that a static area does not exist for the personage object (the head). If a static area above the head is found, then the process is repeated on the right and left of the head or of the detected head and torso or shoulders. If the three static regions are confirmed, then the "bird cage" exists. Thereafter, if the technology detects a head or torso or face or shoulder or some other personage object inside the area bounded by the static boundary, it will be assumed that the personal object belongs to the same person who was present in the previous frame, and thus the detected head, face and torso etc. will be considered as corresponding to the same person. If personage objects are detected in this "bird cage" (i.e. taking historical data into account) then the confidence levels or reliability for accuracy for the head, face, upper chest etc. will be higher than if detected outside the boundary.

Reference to the drawings illustrating various views of exemplary embodiments is now made. In the drawings and the description of the drawings herein, certain terminology is used for convenience only and is not to be taken as limiting the embodiments of the present disclosure. Furthermore, in the drawings and the description below, like numerals indicate like elements throughout.

Figure 2A:
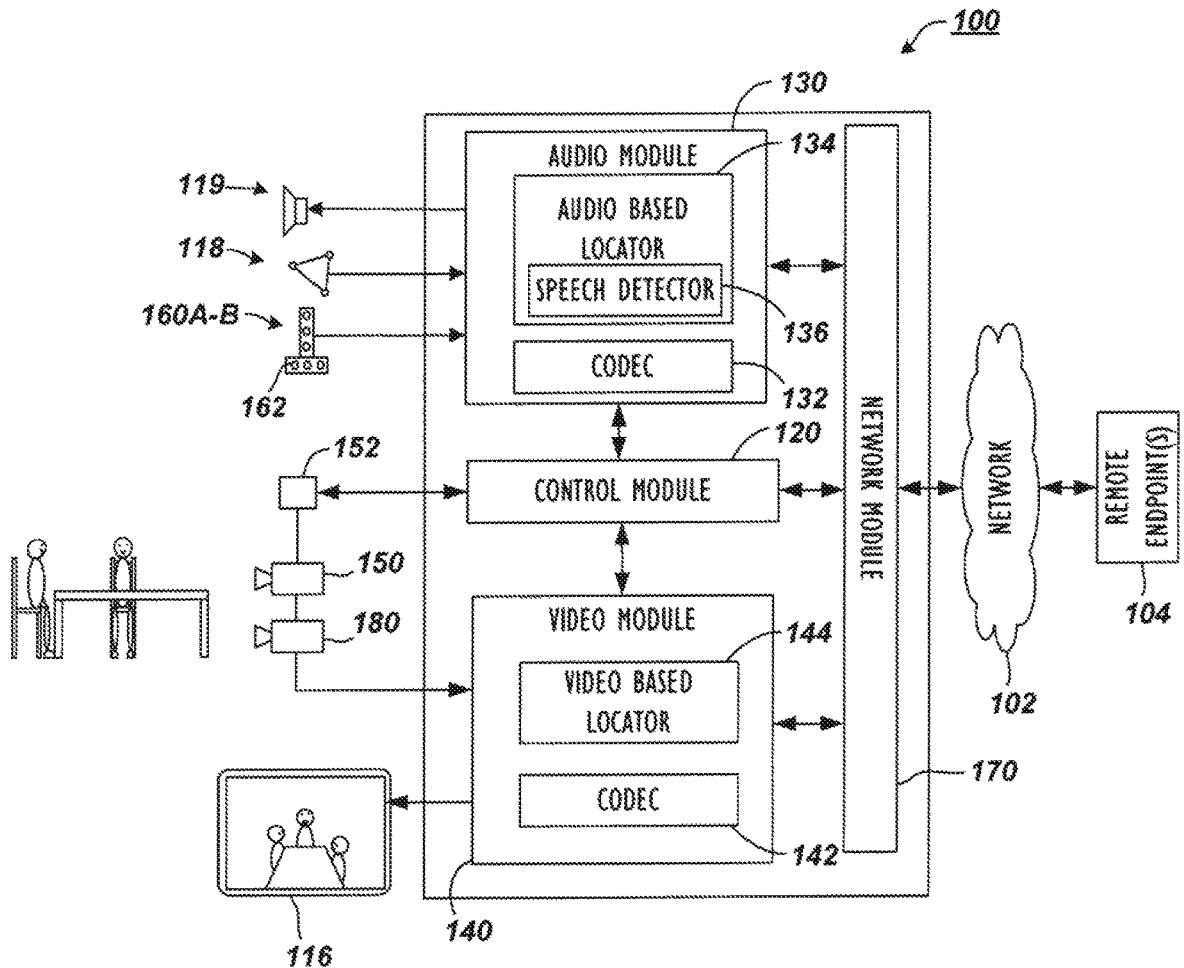
FIG. 2A illustrates a videoconferencing endpoint according to certain teachings of the present disclosure.

A videoconferencing apparatus or endpoint 100 in FIG. 2A communicates with one or more remote endpoints 104 over a network 102. Among some common components, the endpoint 100 has an audio module 130 with an audio codec 132 and has a video module 140 with a video codec 142. These modules 130/140 operatively couple to a control module 120 and a network module 170.

During a videoconference, a adjustable camera(s) 150 captures video and provides the captured video to the video module 140 and codec 142 for processing. Additionally, one or more microphones 118 capture audio and provide the audio to the audio module 130 and codec 132 for processing. These microphones 118 can be table or ceiling microphones or part of a microphone pod or the like, and the endpoint 100 uses the audio captured with these microphones 118 primarily for the conference audio.

Separately, if available for the endpoint 100, microphone arrays 160A-B having orthogonally arranged microphones 162 may also capture audio and provide the audio to the audio module 130 for processing. Preferably, the microphone arrays 160A-B include both vertically and horizontally arranged microphones 162 for determining locations of audio sources during the videoconference. Therefore, the endpoint 100 can use the audio from these arrays 160A-B primarily for camera tracking purposes and not for conference audio, although their audio could be used for the conference.

After capturing audio and video, the endpoint 100 encodes them using any of the common encoding standards, such as MPEG-1, MPEG-2, MPEG-4, H.261, H.263 and H.264, and the network module 170 outputs the encoded audio and video to the remote endpoints 104 via the network 102 using any appropriate protocol. Similarly, the network module 170 receives conference audio and video via the network 102 from the remote endpoints 104 and sends these to their respective codec 132/142 for processing. Eventually, a loudspeaker 119 outputs conference audio, and a display 116 outputs conference video. Many of these modules and other components can operate in a conventional manner well known in the art so that further details are not provided here.

For the disclosed endpoint 100, the adjustable camera(s) 150 can be a steerable Pan-Tilt-Zoom (PTZ) camera or an Electronic Pan-Tilt-Zoom (EPTZ) camera. Either way, the adjustable camera(s) 150 can be adjusted, steered, or directed to alter its viewing orientation of the environment. To control the view captured by the adjustable camera(s) 150, the endpoint 100 uses an audio-based locator 134 and/or a video-based locator 144 to determine locations of participants and frame views of the environment and participants. Then, the control module 120 operatively coupled to the audio and video modules 130/140 uses audio and/or video information from these locators 134/144 to send camera commands to the adjustable camera(s) 150 to alter its viewing orientation. For example, these camera commands can be implemented by an actuator or local control unit 152 having motors, servos, and the like that steers the camera 150 mechanically. Alternatively, these camera commands can be implemented as electronic signals to be handled by the camera 150.

To determine the viewing orientation, the control module 120 as noted above uses audio information obtained from the audio-based locator 134 and/or video information obtained from the video-based locator 144. For example and as described in more detail below, the control module 120 uses audio information processed by the audio-based locator 134 from the horizontally and vertically arranged microphone arrays 160A-B. The audio-based locator 134 then uses a speech detector 136 to detect speech in captured audio from the arrays 160A-B and determines a location of a current speaker. The control module 120 uses the determined location of the speech to then steer the adjustable camera(s) 150 toward that location so the camera 150 can capture video of a current speaker if desired.

Endpoint 100 can use adjunct camera 180 to perform a number of useful functions. In particular, the adjunct camera 180 can count the number of participants in the near-end environment (e.g., room) using person detection. In turn, the endpoint 100 can use this information in tracking the participants and can forward this information to the far-end endpoints 104, to a multi-point control unit (not shown), or to some other device. How the adjunct camera 180 can be used to count participants will be explained later with reference to the participant detection used by the endpoint 100.

The endpoint 100 can also use the adjunct camera 180 to determine the dynamic environment of the videoconference. In particular, the endpoint 100 can process video from the adjunct camera 180 to frame the participants in the room more effectively or to make optional close-up views on an active speaker. Moreover, the endpoint 100 can process video from the adjunct camera 180 so the endpoint 100 can automatically control the viewing orientation of the adjustable camera(s) 150 to meet the conference's dynamic needs.

In one embodiment, the adjunct camera 180 can be stationary, although an adjustable camera can be used. In general, the adjunct camera 180 captures a wide, stationary view of the environment in contrast to the adjustable view obtained with the adjustable camera(s) 150. During the videoconference, the adjunct camera 180 therefore captures wide-angle video of the environment, which gives context to the adjustable view of the adjustable camera(s) 150. In turn, the control module 120 uses video information processed by the video-based locator 144 from the adjunct camera 180 to determine the locations of participants, to determine the framing for the view of the adjustable camera(s) 180, and to direct the adjustable camera(s) 150 at the participants.

Usually the wide view, stationary video from the adjunct camera 180 is not sent from the endpoint 100 to the far-end endpoints 104 because the video may be of lower quality, may be too wide, or may have other issues. However, in some situations, the wide, stationary video from the adjunct camera 180 can be displayed at the far-end endpoints 104 when multiple participants at the near-end are speaking or when the adjustable camera(s) 150 is moving to direct at one or more speakers. Transitions between the two video views from the cameras 150 and 180 can be faded and blended as desired to avoid sharp cut-a-ways when switching between camera views. Details of such coordination are disclosed in co-pending U.S. Pat. Pub. 2011/0285808, filed 18 May 2010 and entitled "Videoconferencing Endpoint Having Multiple Voice-Tracking Cameras," which is incorporated herein by reference in its entirety.

Figure 2B:
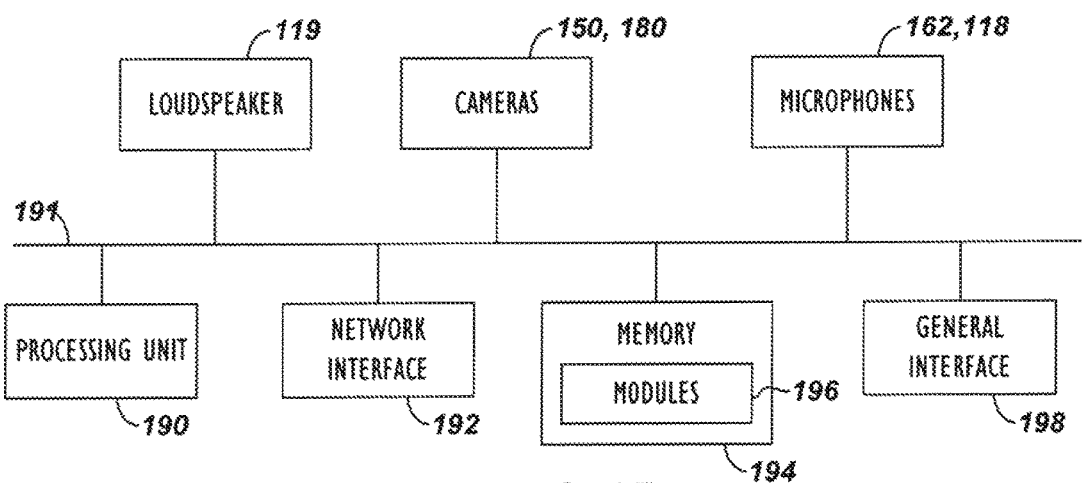
FIG. 2B schematically illustrates components of the endpoint of FIG. 2A.

Having a general understanding of the endpoint 100 and how the two cameras 150 and 180 can be used, discussion now turns to FIG. 2B to briefly discuss some exemplary components for the endpoint 100. As shown and discussed above, the endpoint 100 has the adjustable camera(s) 150, the adjunct camera 180, and the several microphones 118/162A-B. In addition to these, the endpoint 100 has a processing unit 190, a network interface 192, memory 194, and a general input/output (I/O) interface 198, which are all coupled via a bus 191. Each of these components can be on a single device or can be shared between separate devices depending on how the endpoint 100 is implemented as discussed below.

The memory 194 can be any conventional memory such as SDRAM and can store modules 196 in the form of software and firmware for controlling the endpoint 100. In addition to video and audio codecs and other modules discussed previously, the modules 196 can include operating systems, a graphical user interface (GUI) that enables users to control the endpoint 100, and algorithms for processing audio/video signals and for controlling the adjustable camera(s) 150 as discussed later.

The network interface 192 provides communications between the endpoint 100 and remote endpoints (not shown). By contrast, the general I/O interface 198 provides data transmission with local devices such as a keyboard, mouse, printer, overhead projector, display, external loudspeakers, additional cameras, microphone pods, etc. The endpoint 100 can also contain an internal loudspeaker 119.

The cameras 150 and 180 and the microphone arrays 160A-B capture video and audio, respectively, in the videoconference environment and produce video and audio signals transmitted via the bus 191 to the processing unit 190. Here, the processing unit 190 processes the video and audio using algorithms in the modules 196. For example, the endpoint 100 processes the audio captured by the microphones 118/162A-B as well as the video captured by the adjunct camera device 180 to determine the location of participants and direct the adjustable camera(s) 150. Ultimately, the processed audio and video can be sent to local and remote devices coupled to interfaces 192/198.

Before turning to operation of the endpoint 100 during a videoconference, discussion first turns to example implementations of the disclosed endpoint 100. In general, the various modules (e.g., 120, 130, 140, 170) and components (e.g., 150, 160A-B, 180) of the endpoint 100 can be implemented as one unit, such as a videoconferencing unit, or they may be shared between two or more units, such as a videoconferencing unit and another video processing device, such as disclosed below.

Turning to FIGS. 3A-1 and 3A-2, a video processing device 110 according to the present disclosure for the disclosed endpoint 100 couples to a separate unit 115, which can be a stand-alone videoconferencing unit or can be a personal computer configured for desktop videoconferencing. The video device 110 has a housing and may or may not have horizontal and vertical microphone arrays 160 disposed thereon. If present, these arrays 160 can each have three microphones, although either array 160 can have a different number than depicted.

In general, the video device 110 can include some or all of the necessary components for conducting a videoconference, including audio and video modules, a network module, a control module, etc., as discussed above. Alternatively, all or some of the necessary videoconferencing components may be housed in the separate unit 115 coupled to the device 110. Thus, the video device 110 may be a stand-alone unit having the adjustable camera(s) 150, the microphone arrays 160 (if present), the adjunct camera 180, and other related components, while the separate unit 115 can handle all of the videoconferencing functions. In at least one embodiment, he video device 110 and the separate unit 115 can be combined into one unit if desired.

As shown, the video device 110, (when a separate component as in FIG. 3A-1), can couple to the videoconferencing unit 115 via an RS-232 serial cable or the like. In general, the adjunct camera 180 can be integrated into or separately coupled to the housing of the video device 110. Either way, the adjunct camera 180 is physically co-located with the main, adjustable camera 150. If the adjunct camera 180 is a separate component from the video device 110, then the adjunct camera 180 can connect to the videoconferencing unit 115 via a USB cable, Ethernet cable, wireless connection, or the like that sends video signals. Other connections can be used for other housing configurations for the unit 115, device 110, and cameras 150 and 180.

In one arrangement as shown in FIG. 3A-1, the adjunct camera 180 can be a webcam or comparable type of camera that installs onto or is added to the video device 110, which has the adjustable camera(s) 150. For example, the housing for the video device 110 may have a holder and electronic connector (not shown) for holding and connecting the adjunct camera 180 onto the video device 110. Alternatively, the adjunct camera 180 can be a camera of a peripheral device, such as a portable cellphone, tablet, laptop, PC-based web cam, or the like, and the housing for the video device 180 may include a holder and a connector (not shown) for such a peripheral device.

In another embodiment, the adjunct camera 180 can be a second camera of a dual camera unit, such as disclosed in incorporated U.S. Pat. Pub. 2011/0285808. For example, FIG. 3A-2 shows an embodiment of the video device 110 having two integrated cameras 150 and 180. Although both cameras may be mechanical or electronic PTZ cameras, the adjunct camera 180 may not be expected to move during the videoconference because it may be used to obtain the stationary, wide view of the surrounding environment according to the purposes disclosed herein.

Whichever way the video device 110 is implemented, the adjunct camera 180 captures video in a stationary, wide view of the videoconferencing environment. As such, the adjunct camera 180 need not be designed or expected to move during the videoconference to obtain the view of the surrounding environment. Additionally, the adjunct camera's captured video can be continuous video, intermittent video clips, or even video stills or frame, as processing capabilities may dictate. The video resolution of the adjunct camera 180 is preferably high, such as 1080p or 720p. The frame rate of the adjunct camera 180 can be low to reduce compute costs, and a low frame rate of less than 5 fps may be used. However, a higher frame rate is generally better for motion tracking if compute costs are not an issue. Still, the frame rate of the adjunct camera 180 can still be low for the motion detector 204 to operate according to the purposes disclosed herein, and even a frame rate as low as 2 frames per second can be used, which may be a practical frame rate available in some implementations due to limited computing powers, limited data bandwidth, or other reason. Furthermore, the video device 110 may be able to adjust the frame rate during processing depending on whether motion is to be used to track movements and whether compute resources are available.

By contrast, the adjustable camera(s) 150 is a controllable camera and is intended to obtain directed views of the videoconference environment. The adjustable camera(s) 150, therefore, has a video resolution and frame rate suitable for videoconferencing, which can be a video resolution up to 1920×1080 (1080p) resolution or 1280×720 (720p) up to 60 fps. The adjustable camera(s) 150 can have image processing components 152 that can include an actuator if not an EPTZ camera, and the components 152 can be operatively coupled to a local control unit housed in the device 110. More than one such adjustable camera can be implanted to capture multiple feeds, which can be combined for transmission to a remote location.

FIG. 3B illustrates non-limiting examples of components that can be part of the video device 110 of FIGS. 3A-1 and 3A-2, especially when the device 110 is a stand-alone unit. The video device 110 includes the microphone arrays 160, a control processor 111, a Field Programmable Gate Array (FPGA) 112, an audio processor 113, and a video processor 114. As noted above, the video device 110 can be an integrated unit having the adjustable camera(s) 150 integrated therewith and having the adjunct camera 180 separately connected onto the device's housing, or the adjunct camera 180 and the adjustable camera(s) 150 can be integrated with the device 110.

During operation, the FPGA 112 captures video inputs from the cameras 150 and 180 and sends the input video to the video processor 114. The FPGA 112 can also scale and composite video and graphics overlays. The audio processor 113, which can be a Digital Signal Processor, captures audio from the microphone arrays 160 and performs audio processing, including echo cancellation, audio filtering, and source tracking.

The video processor 114, which can also be a Digital Signal Processor (DSP), captures video from the FPGA 112 and handles motion detection, participant detection, and other video processing to assist in tracking speakers as described in more detail below. For example, the video processor 114 can perform a motion detection algorithm on video captured from the adjunct camera 180 to check for motion. This can avoid directing the adjustable camera(s) 150 at reflections from walls, tables, or the like. In addition, the video processor 114 can use a face-finding algorithm on the video from the adjunct camera 180 to further increase the tracking accuracy by confirming that a candidate speaker location does indeed frame a view having a human face. Detecting a human face can use biometric analysis looking for features of the human face and other known techniques available in the art. Furthermore, biometric measurements of the detected face can be used as an identifier and can be associated with other information about the detected face, such as location, size, tone, etc., to uniquely identify the face and the underlying participant. In some embodiments however, a face finding algorithm is not required.

The control processor 111, which can be a general-purpose processor (GPP), handles communication of the device 110 with the videoconferencing unit 115 and handles camera control and overall system control of the device 110. For example, the control processor 111 controls the pan-tilt-zoom communication for the adjustable camera(s) 150 and controls the camera switching by the FPGA 120.

With an understanding of the components of the endpoint 100 from FIGS. 2A through 3B, discussion now turns to how the adjunct camera 180 can be used to improve operation of the endpoint 100 during a videoconference so the endpoint 100 can analyze video from the camera 180 and automatically frame participants in the environment in a dynamic way as the videoconference is conducted.

Overall, the endpoint 100 performs auto-framing of the dynamic conferencing environment effectively using the adjunct camera 180, face detection, torso detection etc., and motion detection as discussed above. The framing is automatic or dynamic as the videoconference is conducted without the need for user intervention. For example, the endpoint 100 adjusts the bounded view of the adjustable camera(s) 150 dynamically when people walk in or out of the videoconference environment. Additionally, the auto-framing functions when participants turn their heads whichever way they want during the videoconference—even to the point that the participants turn away from the camera 180 and their faces are no longer visible to the camera 180.

Figure 4:
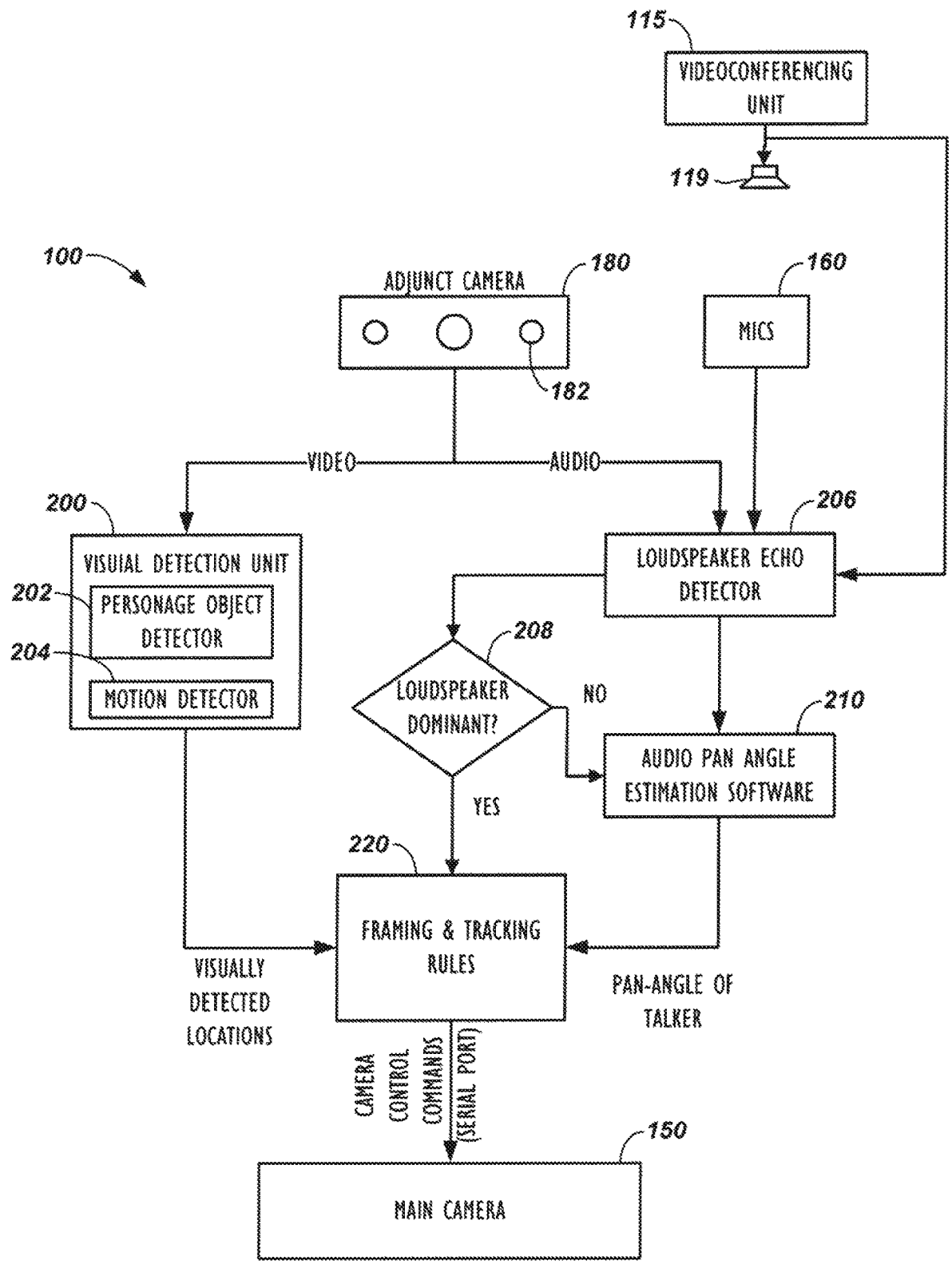
FIG. 4 schematically illustrates software processing performed by the disclosed endpoint.
Figure 5:
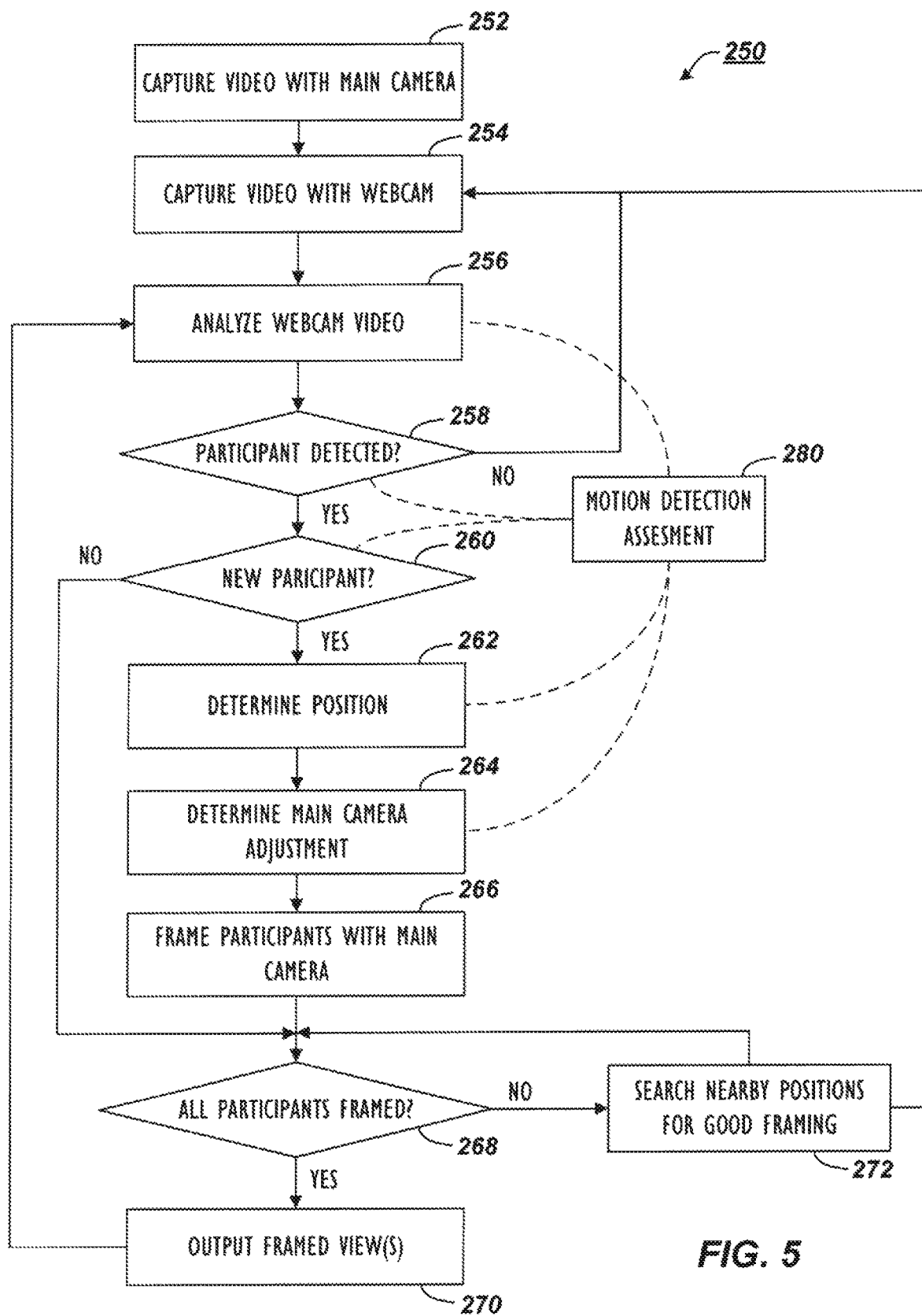
FIG. 5 illustrates a flowchart showing the processing performed by the disclosed endpoint.

Turning to the block diagram of the endpoint 100 in FIG. 4 and the auto-framing process 250 in FIG. 5, operation begins with the endpoint 100 capturing video from both cameras 150 and 180 (Blocks 252 and 254). (To facilitate discussion, reference numerals from previous figures are used throughout the description of the process 250.) As the videoconference proceeds, the endpoint 100 analyzes the video captured with the adjunct camera 180 (Block 256) and detects personage objects (Decision 258). As shown in the endpoint 100 of FIG. 4, for example, the video from the adjunct camera 180 is sent to a visual detection unit 200 that detects the visual location of all the participants in the room. Using a personage object detector 202, for example, the endpoint 100 detects where people are located at the near-end of the videoconference during a particular time interval. The visual detection unit 200 uses a motion detector 204 to detect motion in the adjunct camera's video and can use skin tone detection and other video processing techniques.

Once a participant is visually detected in the adjunct camera's view (Decision 258) as shown in FIG. 5, the endpoint 100 determines whether this is a new participant (Decision 260). This would naturally be the case if the videoconference just started. During later processing, however, the endpoint 100 can determine that the detected participant is a new participant by tracking and storing previous locations of participants' faces and other personage objects, finding a detected face for a participant in a new location not previously tracked, and cross-referencing the detected participant against other participant IDs.

If a new participant is detected, the endpoint 100 determines the position of the detected participant (Block 262). In particular, the endpoint 100 can determine the position, orientation, size, tone, biometric measurements, etc. of the detected participant, and this participant-related information can be used for facial recognition and tracking and in the framing and tracking rules discussed below. Then, the endpoint 100 determines what adjustment is needed for the adjustable camera(s) 150 to frame all of the detected participants, or a suitable subset thereof according to the framing and tracking rules (Block 264). As set forth above, a number of techniques can be used to localize a participant relative to the adjustable camera(s) 150.

In one example, the endpoint 100 can use participant detection techniques to detect and locate participants in the adjunct camera's stationary view. For example, the endpoint 100 can find participants by finding regions that are likely to contain human skin, and then from these, the endpoint 100 can find those regions that indicate the location of a face in the captured view. Details related to skin tone and face detection (as well as audio locating) are disclosed in U.S. Pat. No. 6,593,956 entitled "Locating an Audio Source," which is incorporated herein by reference in its entirety. Motion detection may also be used to detect participants. Then, knowing the location of the participants in the adjunct camera's view, the endpoint 100 can adjust the pan, tilt, and/or zoom of the adjustable camera 150 to fit the location of all of the detected participants.

In addition, if the adjunct camera 180 has its own microphones 182 as shown in FIG. 4 or if the endpoint 100 has microphone arrays 160, such as in FIG. 2A, the endpoint 100 can process audio from those microphones using a pan-angle estimation software module 210 as shown in FIG. 4 to estimate the angular orientation of the person talking. This module 210 can be based on audio processing techniques used for a linear microphone array, which uses the phase information of the microphone signals, or the audio processing techniques of the pan-estimation software module 210 can use any other available technique to determine the pan angle of an audio source.

Continuing with the process 250 in FIG. 5, once the participants are located in the adjunct camera's video, the endpoint 100 converts the locations into camera commands (pan-tilt-zoom coordinates) to adjust the view of the adjustable camera(s) 150. When adjusted, the adjustable camera(s) 150 can then capture all of the participants in the environment so all of the participants are framed in the view of at least one adjustable camera (Block 266).

The participant detection discussed above also uses a motion detection assessment (Block 280) to enhance the participant detection of the endpoint 100. In this assessment 280, the endpoint 100 process the video from the adjunct camera 180 for motion in conjunction with participant detection so the endpoint 100 can deal with various situations, such as when a participant turns his head away from the video device 110. Further details related to this participant detection and motion detection are discussed below with reference to FIGS. 7 through 10B.

Because there may be challenges to framing the participants, the endpoint 100 determines if the participants are framed properly in the current view (Decision 268). If not, the endpoint 100 searches the active view and/or adjacent portions of the camera's view to adjust the view to frame the participants (Block 270). Adjusting the view can be repeated as many times as needed and can involve processing video from both the adjustable camera(s) 150 and the adjunct camera 180. Ultimately, if the locations of participant cannot be determined or the participants cannot be properly framed, the endpoint 100 may adjust the adjustable camera(s) 150 to a default wide-view (Block 254).

Using the video and audio information, for example, a framing and tracking rules software module 220 as shown in FIG. 4 uses ad-hoc rules to send framing adjustments to the adjustable camera(s) 150. The sent framing adjustments are based on the location of participants (e.g., the locations of their heads) and the pan-angle of the talker, and the commands sent to the adjustable camera(s) 150 are intended to optimally frame the people in the room. These framing adjustments can also be used to track a particular participant and to zoom in and out on various participants that are talking depending on the configuration.

Several techniques can be used for determining if the current view of the adjustable camera(s) 150 properly frames the current participants. For example, once the adjustable camera(s) 150 is done steering, the endpoint 100 can use spatial algorithms to point the center focus of the adjustable camera(s) 150 at a central point between the detected participant locations. Additionally, the outside boundary from the zoom of the adjustable camera(s) 150 may be set to define a boarder region of a specific size (i.e., number of pixels relative to overall width or height of the zoomed view) outside the outlying detected participants in the view.

If the algorithm reports good framing (Decision 268), the endpoint 100 outputs the framed view (Block 270). If good framing is not reported, then the position of the adjustable camera(s) 150 is fine-tuned to continue searching for good framing (Block 272). If good framing still cannot be found, the endpoint 100 may switch to a default wide view of the adjustable camera(s) 150 (Block 254).

Isolating Loudspeaker Audio when Adjunct Camera has Microphones

When the adjunct camera 180 includes microphones 182 to track participants as shown in FIG. 4, the endpoint 100 preferably does not process audio signals captured when the loudspeaker 119 of the endpoint 100 is outputting audio. For example, if the loudspeaker 119 is disposed on a table where the participants are seated, the microphones 182 of the adjunct camera 180 would detect the loudspeaker 119 as an audio source when the endpoint 100 outputs audio for the loudspeaker 119. Moreover, even if the loudspeaker 119 is not in the field of view of the adjunct camera 180, any sound reflected in the room when the loudspeaker 119 outputs audio can be detected by the adjunct camera's microphones 182 as a source. A number of techniques can be used to handle this situation.

In one technique, operation of the adjunct camera 180 can be integrated into the operation of the videoconferencing unit 115. In this way, any audio processing of the microphones 182 associated with the adjunct camera 180 can be disabled when the videoconferencing unit 115 outputs audio for the loudspeaker 119. For this integrated operation, internal components within the endpoint 100 will be able to coordinate when to disable audio processing the adjunct's microphones 182 when the loudspeaker 119 outputs audio.

In embodiments in which the adjunct camera 180 is integrated into the video device 100, and processing of the adjunct camera's microphones 182 is handled separately from the loudspeaker 119 of the videoconferencing unit (115), then disabling processing of audio from the adjunct camera's microphones 182 may be less straight-forward. When data communication is possible between the unit (115) and the video device 110 having the adjunct camera 180, then a signal from the unit 115 can indicate to the video device 110 that audio is being sent to the loudspeaker 119 for output, and the video device 110 can disable processing the audio from the adjunct's microphones 182.

Alternatively, the video device 110 can uses a far-end echo detector 206, similar to what is disclosed in U.S. Pat. Pub. 2011/0069830 incorporated herein by reference, to determine when audio is being output by the loudspeaker 119 so the loudspeaker's audio can be isolated from the input signals captured by the adjunct camera's microphones 182. The loudspeaker echo detector receives the microphones' signal(s) and the loudspeaker signal as inputs. In general, the far-end echo detector 206 examines the correlation between the loudspeaker signal and the microphone signal and determines whether there is a predominant presence of the loudspeaker signal in the microphone signal. The detector 206 decides if the loudspeaker signal is predominant (Decision 208). If so, then the framing and tracking rules of the module 220 will not zoom in on the location of the loudspeaker 119 because the audio pan angle estimation module 210 may be bypassed or ignored. If the loudspeaker signal is not dominant, then the framing and tracking rules of the module 220, if configured to do so, will be free to decide to zoom in on a talker located by the pan angle estimation module 210.

Finally, since the location of the loudspeaker 119 may remain the same in the environment regardless of which participants are present, the video device 110 can recognize that this location corresponds to the loudspeaker 119 and not to a participant so that audio detection and pan angle estimation associated with the loudspeaker's location can be ignored.

Example of Auto-Framing

Now that operation of the endpoint 100 has been described above with reference to FIGS. 4-5, discussion turns to FIGS. 6A-6D, which diagram an example of how the endpoint 100 can use video from the adjunct camera (180) to determine and control the view obtained with the adjustable camera(s) (150). A depicted wide view 300 represents the video view captured by the adjunct camera (180) of the videoconferencing environment. The wide view 300 is shown divided into several blocks 302 (9×9 in this example, but any other value could be used). The blocks 302 can preferably be macroblocks having a suitable block size of pixels, as commonly used by video compression algorithms. Each of these blocks 302 may correlate to particular pan, tilt, and zoom coordinates of the adjustable camera(s) (150), which can be determined by the given geometry.

Figure 6A:
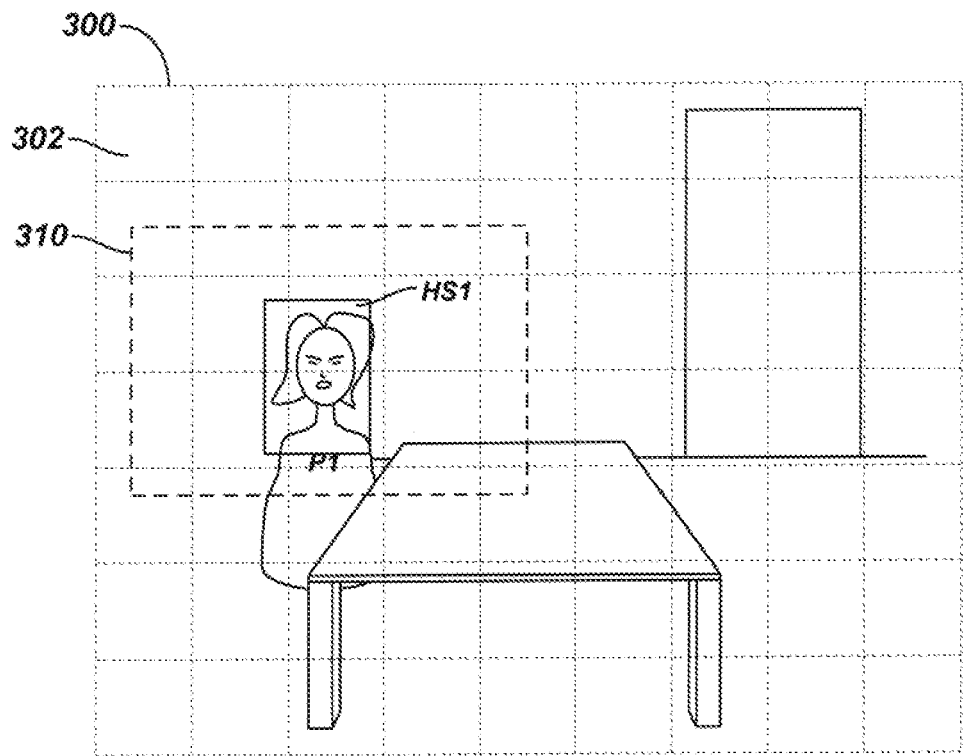
FIGS. 6A-6D illustrate examples of participant detection and camera adjustments performed by the disclosed endpoint.

At the start of the videoconference as shown in FIG. 6A, there may be a single participant P1 present in the environment. In this example, a videoconferencing device detects the head and shoulders HS1 of the participant P1 and determines the location of the head and shoulders HS1 in the adjunct camera's stationary view 300 of the environment. Based on this determined location, the adjustable camera(s) (150) is directed to capture a framed view 310 of the single participant P1.

Figure 6B:
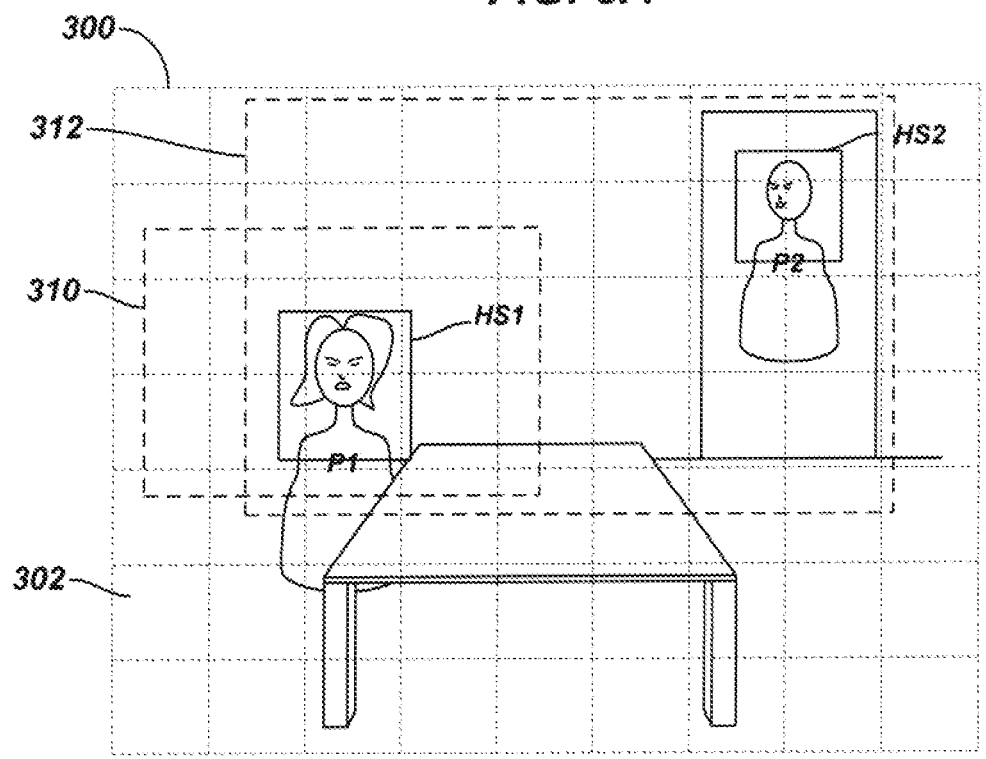

At some point as shown in FIG. 6B, another participant P2 may enter the environment. Depending on the arrangement, this participant P2 may not be visible within the initial boundary of the framed view 310 of the first participant P2. Yet, the adjunct camera 180 captures the new participant P2 in the camera's wide, stationary view 300. Person detection as discussed herein detects the new participant's head and shoulders HS2 in this view 300, and the endpoint 100 determines a new framed view 312 to incorporate the two participants P1 and P2.

In at least one embodiment, the endpoint 100 does not adjust the view of the adjustable camera(s) 150 when a participant is "moving," as would occur when a participant is walking into a room, for example. Instead, the adjustable camera(s) 150 is adjusted when the participant has "settled," meaning that the participant has had substantially the same position (remained within a "bird cage") for some period of time or for some number of frames. This feature can be especially useful when people walk in or out of a room when the videoconference call begins.

In this example, assuming that the new participant has "settled" (e.g., the participant P2 has remained at the door for a certain period of time or a number of frames), the endpoint 100 determines that the initial boundary of the framed view 310 contains less than all of the persons P1 and P2 detected in the current stationary view 300 being processed. Knowing the locations of the detected persons P1 and P2 (i.e., knowing which blocks 302 of the stationary view 300 contain the persons P1 and P2), the endpoint 100 determines a subsequent boundary for a new framed view 312 by adjusting the initial boundary to contain all of the detected persons P1 and P2 in the stationary view 300.

As part of this processing, the locations of participants' faces and other elements of the stationary view 300 can be stored in memory. For instance, the location of the first participant's head and shoulders HS1 in the wide view 300 would initially be stored. Then, after a time interval, the endpoint 100 processes the stationary view 300 again to detect one or more new participant locations of any new participants in the environment by performing participant detection in the adjunct camera's stationary view 300. If a new participant is detected (e.g., second participant's head and shoulders HS2) as noted above, the endpoint 100 can detect a difference between the current participant locations (e.g., head and shoulders HS1's location) and the new participant locations (e.g., head and shoulders HS2's location) and can adjust the boundary for the adjustable camera(s) 150 based on the detected difference in participant locations.

After initial framing in the adjusted view 312 of the adjustable camera(s) (150) to capture both participants P1 and P2, the new participant P2 may move in the environment while the original participant P1 stays in place or vice-versa. As this occurs, the framed view 312 of the adjustable camera(s) 150 is adjusted as needed.

Figure 6C:
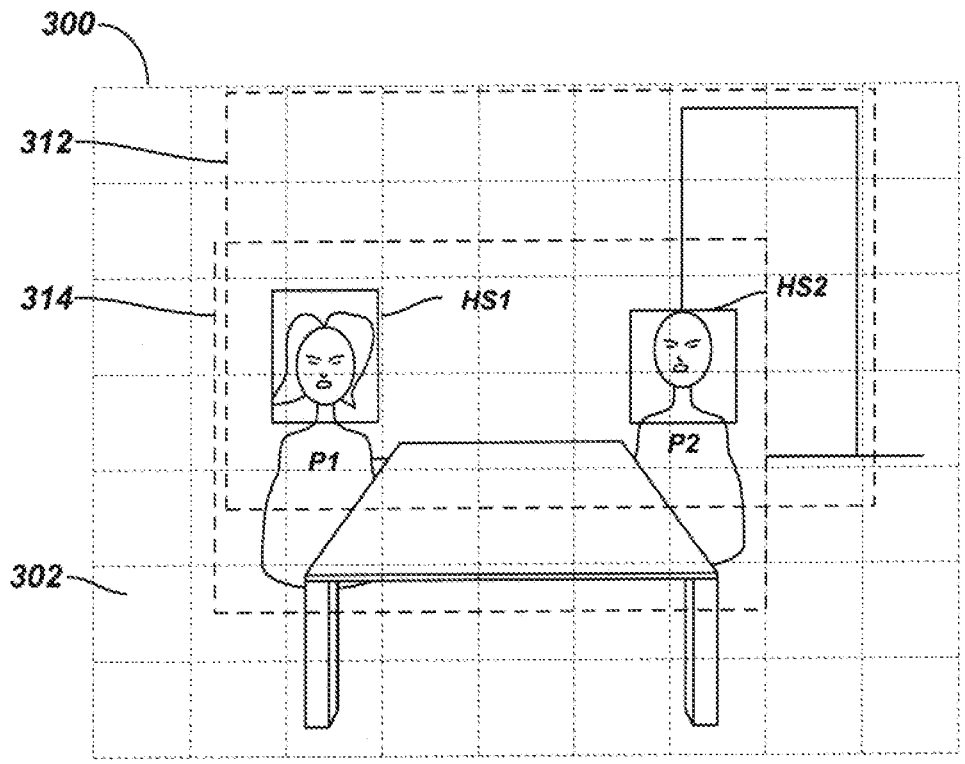

Eventually, after the new participant P2 enters and stops moving as shown in FIG. 6C, the adjustable camera(s) 150 may settle on a framed view 314 of both participants P1 and P2, selecting an appropriate width of the view to accommodate the two participants P1 and P2 and an appropriate level to keep their faces or heads close to the vertical centerline of the view.

As part of the process for adjusting the framed view of the adjustable camera(s) 150, the endpoint 100 may use captured audio of the environment in configuring the adjustments to the view of the adjustable camera(s) 150. To do this as noted above, the endpoint 100 can determine bearing angles of locations of speech audio sources in the environment. The determined bearing angles of the source locations can then be coordinated with participant locations detected in the environment so the coordinated information can be used in adjusting the view of the adjustable camera(s) 150. The endpoint 100 may even adjust the view of the adjustable camera(s) 150 to only capture the view of a participant who is speaking at some point during the conference.

The timing involved in detecting a visual change in the stationary view 300 and/or detecting speech audio in the environment and then making the adjustments to the adjustable camera(s) 150 can be predetermined or may vary. Preferably, the adjustments provide for smooth visual effects and account for appropriate processing. Accordingly, the framing and tracking rules of the module 220 can be flexible for various situations.

For example, when one of the participants (e.g., P1) talks, the framing and tracking rules of the module 220 may be configured to direct the adjustable camera(s) 150 at that participant P1 as the current talker. Before actually directing the camera 150, however, the framing and tracking module 220 can include a transitional mode that delays this action. Instead, the framing and tracking module 220 keeps the adjustable camera(s) 150 in its current view capturing all of the participants P1 and P2 while the participant P1 talks. If this participant P1 continues speaking for a certain period of time, the rules of the module 220 can then direct the adjustable camera(s) 150 to zoom in on that participant P1 as the current talker.

Figure 6D:
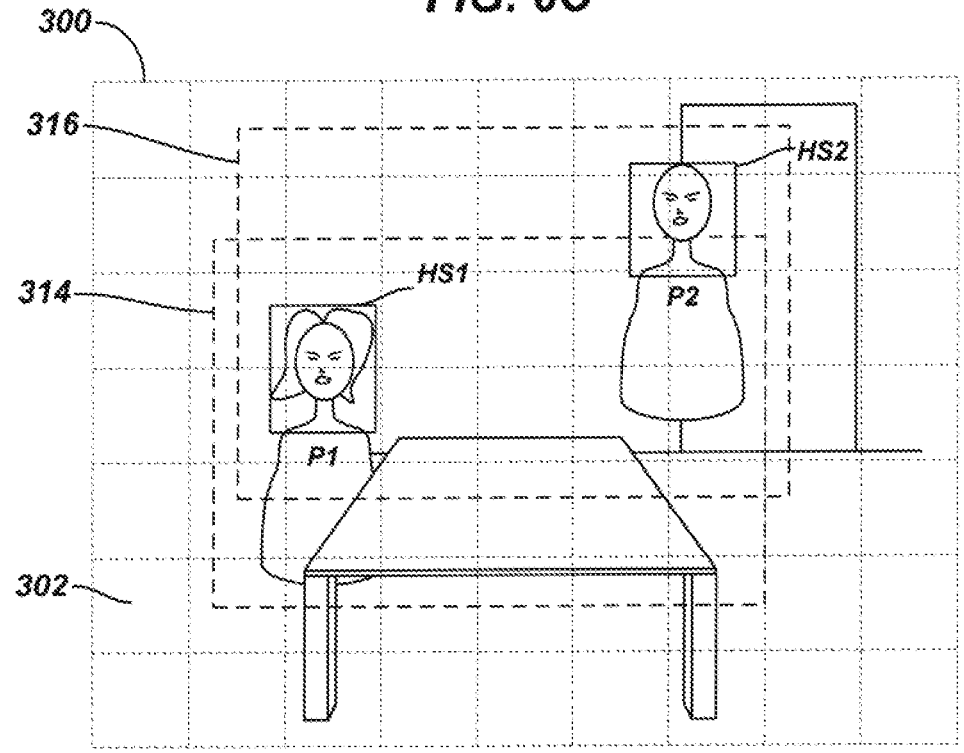

At some point as shown in FIG. 6D, one of the participants P2 may start moving such that the participant's head and shoulders HS2 leaves the adjustable camera(s)'s framed view 314 or moves out of a designated boundary. However, the participant can in some cases be tracked using the participant's ID. Again, the adjunct camera 180 still captures images of the environment in the wide view 300, and the information is used to determine a new framed view 316 in FIG. 6D for the adjustable camera(s) 150 according to the steps previously discussed.

As will be appreciated, the framing of the participants P1 and P2 can account for a number of such changes as described above, including inclusion of one or more additional participants other than the participants P1 and P2 already present. Likewise, the framing can account for either of the participants P1 and P2 leaving the environment so that the endpoint 100 no longer detects that participant. As these scenarios show, using the adjunct camera 180 in the endpoint 100 can improve the automated framing of the participants in the videoconference.

Moreover, even if a participant P1 or P2 turns away from the cameras 150 and 180, the participant detection performed by the endpoint 100 may be capable of detecting faces at three-quarter views or other profiles depending on the robustnees of the algorithm. Additionally, even if a participant's face is no longer detected or recognized, the endpoint 100 will not immediately determine that the participant is no longer present in the environment. This makes sense because the participant may turn his head way, bend down, turn to a drawing board, etc. In at least one embodiment, the processing of the endpoint 100 preferably accounts for such intermittent changes as part of its framing and tracking rules in the module (220: FIG. 4). Moreover, even where face information is not available, head information can serve the same end.

To do this, the endpoint 100 can require certain time intervals to transpire to delay implementing changes in the automatic framing of the environment. Additionally, the endpoint 100 can combine motion detection, audio source location, skin recognition, etc. so that the location of a participant is tied to several pieces of information. Should participant detection during a processing interval fail to detect a given personage object of an ID' d participant, the endpoint 100 can use such additional information to keep track of that participant. These and other ID-driven rules can be used by the endpoint 100 to control the endpoint's operation and are described in more detail below.

With an understanding of the endpoint 100 and the process of automatic framing of participants in a videoconference environment, discussion now turns to further features of the present disclosure that enhance the auto-framing achieved. As can be appreciated, the detection results from the personage object detector 202 of FIG. 4 may not always be reliable when performing the auto-framing. For example, the personage object detector 202 can have false alarms or misses when the results are false positives and false negatives. For this reason, the endpoint 100 may use audio information to help frame the participants in the environment. However, as hinted to above, the endpoint 100 uses motion information from a motion detector 204 to accompany the participant detection results when determining the auto-framing of the environment with the framing and tracking rules of the module 220.

Figure 7:
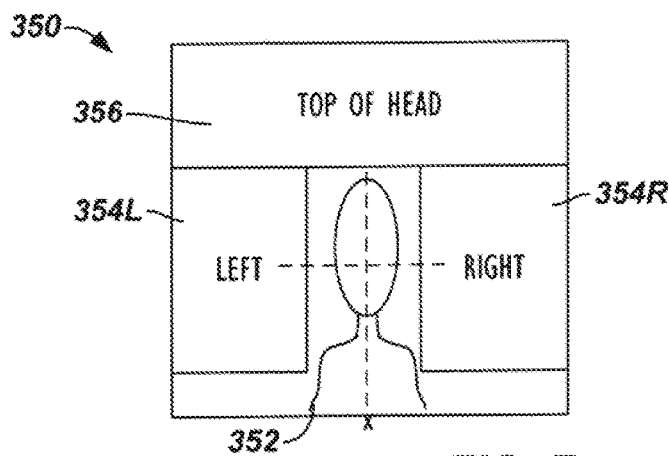
FIG. 7 diagrammatically illustrates an area or region associated with a face used during the processing of the disclosed endpoint.

As noted above, the endpoint 100 can use a bird cage technique to localize a participant. For example, FIG. 7 diagrammatically shows an area or region 350 associated with a participant. The area 350 is divided into regions or sections of interest in which the endpoint (100) checks for motion. In this example, four sections are defined in the area 350 of the detected participant. These sections include a head (and/or face) and shoulder section 352, a Left section 354L, a Right section 354R, and a Top of Head section 356.

The size and shape of these sections 352, 354, and 356 can de different than shown in FIG. 7 and can be adjusted for a given implementation. In general, the head/face and shoulders section 352 encompasses the location of a detected face or head, while the Right and Left sections 354R-L encompass areas to the right and left of the face/head/shoulders location. Finally, the Top of Head section 356 encompasses an area above these sections and above the head of the participant.

The size of the area 350 depends on the size of the detected head and shoulders. Therefore, a participant detected further away in the stationary view of the adjunct camera 180 will have a smaller area 350 defined around them compared to the area 350 for a detected closer participant.

Figure 8A:
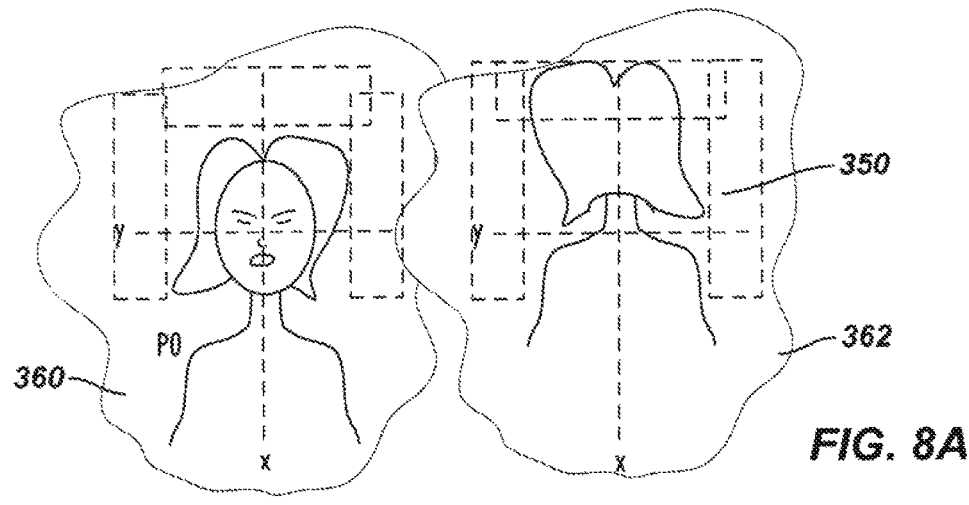
FIGS. 8A-8B illustrate portions of prior and current frames during participant detection and localization.

To illustrate an example, FIG. 8A shows portion of a previous frame 360 relative to portion of a current frame 362 of video captured by the adjunct camera (180). A participant (P0) was detected in the previous frame 360 along with its associated position (x, y), size, characteristics, etc. However, a face is not detected in the current frame 362 for the corresponding position (x, y). This could be because the participant P0 has stood up and turned away from the camera (180) capturing the frames 360 and 362. In this case, the videoconferencing unit detects motion in the surrounding sections of the area 350 and determines that participant P0 has moved. Nevertheless, P0 may be tracked based on the attributes of her ID.

Figure 8B:
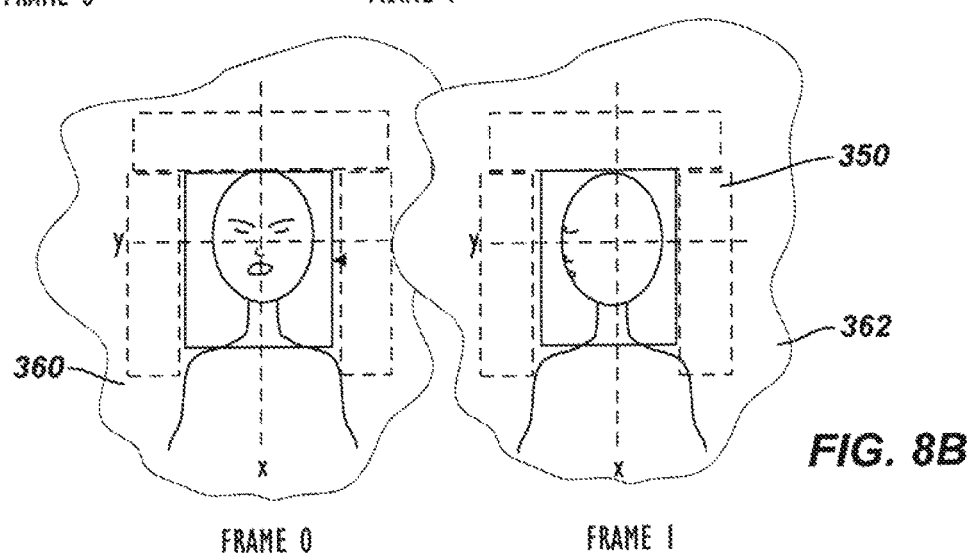

In contrast, FIG. 8B shows portion of a previous frame 360 relative to portion of a current frame 362. A head and shoulder was detected in the previous frame 360 along with its associated position (x, y), size, characteristic, etc. However, a face is not detected in the current frame 362 for the corresponding position (x, y). As shown, this is so because the participant has turned his head away from the camera (180) capturing the frames 360 and 362. In this case however, there is no movement (no moving pixels) in the boundary area 350. Thus the head in the second is the same head in the first frame. Thus, it can be seen that while face recognition and detection are useful, they are not necessarily critical for participant localization. Accordingly, this participant can still remain framed in the auto-framing by the adjustable camera (150).

One or more acts in accordance with flow chart steps or process steps may be performed by a programmable control device executing instructions organized into one or more program modules on a non-transitory programmable storage device. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Non-transitory programmable storage devices, sometimes called a computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Embodiments within this disclosure can include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Embodiments of the disclosure may be practiced in network computing environments with many types of computer system configurations, including personal computers, handheld devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only, and should not be construed so as to limit the scope of the disclosure. Various modifications and changes can be made to the principles and embodiments described herein without departing from the scope of the disclosure and without departing from the claims which follow. Any element in a claim that does not explicitly state "means for" performing a specified function, or "step for" performing a specified function, is not to be interpreted as a "means" or "step" clause as specified in 35 U.S.C § 112, sixth paragraph.

The invention claimed is:

1. An auto-framing and tracking method for a video conference, the method comprising:
   capturing a first feed using a first camera;
   detecting, using a processor, a conference participant in a first frame of the first feed;
   generating, using the processor, a time-of-last-motion array, wherein generating the time-of-last-motion array comprises comparing the first frame to a previous frame of the first feed;
   identifying, using the processor, one or more motion pixels using the time-of-last-motion array;
   determining, using the processor, a boundary in the first feed by iteratively searching for a static region in the first feed based on the one or more motion pixels, the boundary at least partially surrounding a conference participant and forming a bounded area;
   generating, using the processor, a framed view corresponding to the bounded area;
   detecting, using the processor, one or more personage objects within the bounded area in a second frame of the first feed;
   determining, using the processor, responsive to detecting the one or more personage objects within the bounded area, that the boundary was static between capture of the first frame and capture of the second frame; and
   including, using the processor, responsive to determining that the boundary was static between capture of the first frame and capture of the second frame, the framed view within a second feed for transmission to a remote endpoint.

2. The method of claim 1, wherein generating, using the processor, the time-of-last-motion array, further comprises determining a first resolution of the first camera and setting a second resolution of the time-of-last-motion array based, at least in part, on the first resolution of the first camera.

3. The method of claim 2, wherein:
   determining the first resolution of the first camera comprises determining that the first resolution of the first camera is 1280×0720 pixels, and
   setting the second resolution of the time-of-last-motion array based, at least in part, on the first resolution of the first camera comprises assigning 921,600 elements to the time-of-last-motion array.

4. The method of claim 1, wherein determining one or more motion pixels comprises determining that a current illumination value of one or more pixels of a current frame has exceeded an illumination value of one or more corresponding pixels of an earlier frame by a threshold.

5. The method of claim 1, wherein the one or more personage objects correspond to a vertical front face, a left-side face, a right-side face, a right-tilting front face, a left-tilting front face, or some combination thereof.

6. The method of claim 1, wherein the one or more personage objects comprise a left side of an upper torso, a right side of an upper torso, a frontal side of an upper torso, or some combination thereof.

7. The method of claim 1, wherein the one or more personage objects comprise a head, shoulders, torso, face or facial feature, or some combination thereof.

8. The method of claim 1, further comprising:
   adjusting, using the processor, a view of a second camera to a second framed view based on the boundary; and
   including the second framed view within a third feed for transmission to the remote endpoint.

9. The method of claim 1, further comprising tracking, using the processor, a location of the conference participant using an identifier based, at least in part, on the one or more personage objects.

10. The method of claim 1, wherein detecting the conference participant in the first frame includes:
    detecting, using the processor, a facial feature in the first frame;
    detecting, using the processor, a torso in the first frame; and
    determining, using the processor, that the facial feature corresponds to the torso based on a position of the facial feature relative to the torso.

11. A non-transitory computer readable medium storing instructions executable by a processor, the instructions comprising instructions to:
    capture, using a first camera, a first feed;
    detect a conference participant in a first frame of the first feed;
    generate a time-of-last-motion array, wherein generating the time-of-last-motion array comprises comparing the first frame to a previous frame of the first feed;
    identify one or more motion pixels using the time-of-last-motion array;
    determine a boundary in the first feed by iteratively searching for a static region in the first feed based on the one or more motion pixels, the boundary at least partially surrounding a conference participant and forming a bounded area;
    generate a first framed view corresponding to the bounded area;
    detect one or more personage objects within the bounded area in a second frame of the first feed;
    determine, responsive to detecting the one or more personage objects within the bounded area, that the boundary was static between capture of the first frame and capture of the second frame; and
    include, responsive to determining that the boundary was static between capture of the first frame and capture of the second frame, the first framed view within a second feed for transmission to a remote endpoint.

12. The non-transitory computer readable medium of claim 11, wherein the instructions to generate the time-of-last-motion array further comprise instructions to:
    determine a resolution of the first feed;
    set a number of elements of the time-of-last-motion array based, at least in part, on the resolution of the first feed.

13. The non-transitory computer readable medium claim 12, wherein:
    the instructions to determine the resolution of the first feed comprise instructions to determine that the resolution of the first feed is 1280×0720 pixels, and
    wherein the instructions to set the number of elements of the time-of-last-motion array based, at least in part, on the resolution of the first feed comprise instructions to set the number of elements of the time-of-last-motion array to 921,600 elements.

14. The non-transitory computer readable medium of claim 11, wherein the one or more personage objects comprise shoulders.

15. The non-transitory computer readable medium of claim 11, wherein the one or more personage objects comprise a torso.

16. The non-transitory computer readable medium of claim 11, wherein the one or more personage objects comprise a head, shoulders, torso, face or facial feature, or some combination thereof.

17. The non-transitory computer readable medium of claim 11, wherein the instructions further comprise instructions to:
adjust a view of a second camera to a second framed view based on the boundary;
include the second framed view within a third feed for transmission to the remote endpoint; and
remove the first framed view from the second feed.

18. A videoconferencing apparatus, the videoconferencing apparatus comprising:
a processor;
a camera coupled to the processor; and
a memory coupled to the processor and storing instructions executable by the processor, wherein the instructions comprise instructions to:
capture, using a first camera, a first feed;
detect a conference participant in a first frame of the first feed;
generate a time-of-last-motion array, wherein generating the time-of-last-motion array comprises comparing the first frame to a previous frame of the first feed;
identify one or more motion pixels using the time-of-last-motion array;
determine a boundary in the first feed by iteratively searching for a static region in the first feed based on the one or more motion pixels, the boundary at least partially surrounding a conference participant and forming a bounded area;
generate a framed view corresponding to the bounded area;
detect one or more personage objects within the bounded area in a second frame of the first feed;
determine, responsive to detecting the one or more personage objects within the bounded area, that the boundary was static between capture of the first frame and capture of the second frame; and
include, responsive to determining that the boundary was static between capture of the first frame and capture of the second frame, the framed view within a second feed for transmission to a remote endpoint.

19. The videoconferencing apparatus of claim 18, further comprising at least one second camera, and wherein the instructions further comprise instructions to:
adjust a view of the second camera to a second framed view based on the boundary; and
include the second framed view within a third feed for transmission to the remote endpoint.

20. The videoconferencing apparatus of claim 19, wherein the camera comprises a web camera and the second camera comprises a pan-tilt-zoom camera.

* * * * *